J. E. MARSHALL.
Harrow.
No. 198,401. Patented Dec. 18, 1877.
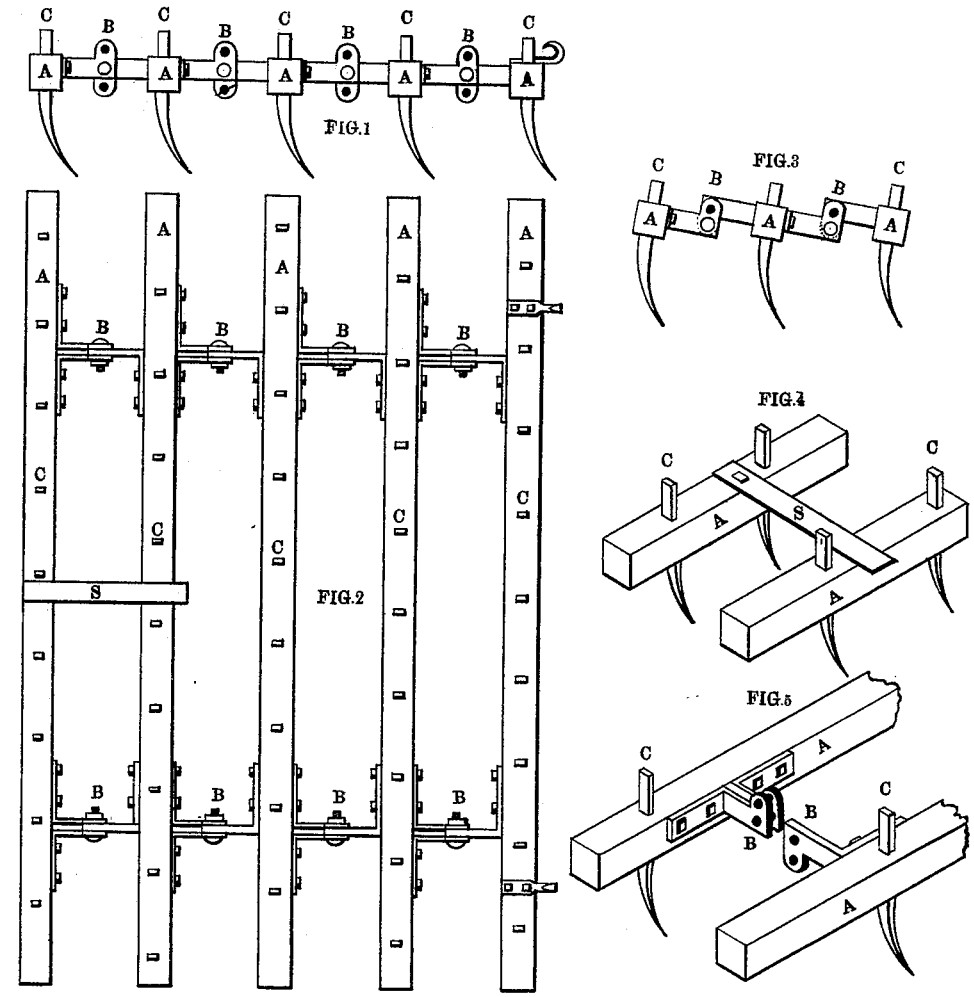
WITNESSES
INVENTOR

UNITED STATES PATENT OFFICE.

JOHN E. MARSHALL, OF COOPER TOWNSHIP, KALAMAZOO COUNTY, MICH.

IMPROVEMENT IN HARROWS.

Specification forming part of Letters Patent No. 198,401, dated December 18, 1877; application filed August 10, 1877.

*To all whom it may concern:*

Be it known that I, JOHN E. MARSHALL, of the town of Cooper, county of Kalamazoo, and State of Michigan, have invented a new and useful Improvement in Harrows, of which the following is a full, clear, and exact description, reference being had to the accompanying drawings, and the letters of reference marked thereon.

Similar letters indicate corresponding parts.

The object of my invention is an adjustable harrow, designed to cut deep or shallow, at the will of the operator, and constructed to adapt itself to the inequalities of the ground, to prevent clogging, and to readily pass over obstructions.

Figure 1 is a vertical section. Fig. 2 is a plan view. Figs. 3 and 5 are sectional views, showing construction and operation of the hinge. Fig. 4 is a section, showing the spring S.

My harrow is constructed with four or more parallel wooden bars at right angles to the line of draft. They are connected by the wrought-iron hinges B, which allow each bar to move independently with a vibratory or rolling motion. The hinge B consists of two iron bars, bolted to the wooden bar A at a sufficient distance apart to receive between them a corresponding bar, bolted to the bar A in front. The ends of these double bars are widened or made with a projection on the upper side, and the corresponding single bar has a similar projection extending downward; or they may be made ┥-shaped. The ends of these bars are perforated, for the reception of a bolt forming the hinge. Two or more perforations are provided to admit of adjusting the angle of the teeth so that they will cut deep or shallow. In order to accomplish the former result, the bolt is inserted through an upper hole in the double bars, and made to pass through a lower hole in the single bar, as shown in Fig. 3. The opposite result is accomplished by reversing this operation.

In order to counteract the tendency of the rear or last bar A to turn upward and backward and throw the teeth out of the soil, the spring S is provided, which causes it to retain its place, but, being elastic, yields sufficiently to permit the teeth to pass over obstructions, and causes them to resume their position when the obstruction is passed.

The teeth are of cast-steel, and they are made to curve forward, with the points projecting to the front, causing them to cut deeply into the soil, and their position with relation to each other is such that each one cuts a track separate from every other.

When the harrow is in operation the bars A (being connected by the hinges B) have a constant vibratory or rocking motion, which causes the teeth to readily free themselves from sods or other obstructions.

Having thus described my invention, what I claim, and desire to secure by Letters Patent, is—

1. In a harrow, the bars A, provided with teeth, in combination with the adjustable hinge B, constructed with the ┳-shaped perforated plates, substantially as described, and for the purpose specified.

2. In a harrow, the spring S, attached as described, in combination with the hinge B and tooth-bars A, substantially as described, and for the purpose specified.

3. The curved teeth C, the bars A, united by the adjustable hinge B, and the spring S, rigidly attached to rearmost bar A, all constructed and combined substantially as described, and for the purpose set forth.

JOHN E. MARSHALL.

Witnesses:
 SAMUEL W. OXRUFORD,
 EDWIN M. IRISH.